US007021677B2

(12) United States Patent
Smith, III

(10) Patent No.: US 7,021,677 B2
(45) Date of Patent: Apr. 4, 2006

(54) SEAL RETAINER WITH METAL SEAL MEMBERS FOR UNDERSEA HYDRAULIC COUPLING

(75) Inventor: Robert E. Smith, III, Missouri City, TX (US)

(73) Assignee: National Coupling Company, Inc., Stafford, TX (US)

( * ) Notice: Subject to any disclaimer, the term of this patent is extended or adjusted under 35 U.S.C. 154(b) by 0 days.

(21) Appl. No.: 10/689,338

(22) Filed: Oct. 20, 2003

(65) Prior Publication Data

US 2005/0082832 A1 Apr. 21, 2005

(51) Int. Cl.
*F16L 19/08* (2006.01)

(52) U.S. Cl. ...................... 285/379; 285/349; 285/111; 285/331; 285/917; 277/602; 277/616; 277/637

(58) Field of Classification Search ................ 285/108, 285/111, 349, 379, 9.2, 817, 331; 277/602, 277/603, 607, 608, 609, 616, 628, 637
See application file for complete search history.

(56) References Cited

U.S. PATENT DOCUMENTS

| | | | | |
|---|---|---|---|---|
| 340,801 | A * | 4/1886 | Maule | 285/331 |
| 344,312 | A * | 6/1886 | Guillemin | 285/327 |
| 612,455 | A * | 10/1898 | Gore | 285/331 |
| 1,178,714 | A * | 4/1916 | Griffin | 285/331 |
| RE18,296 | E | 12/1931 | Pierce | |
| 1,913,982 | A | 6/1933 | Fox | |
| 1,928,821 | A | 10/1933 | Santiago | |
| 2,218,318 | A | 10/1940 | Pfauser | |
| 2,243,265 | A * | 5/1941 | Thomson | 285/235 |
| 2,265,267 | A | 12/1941 | Cowles | |
| 2,284,216 | A * | 5/1942 | Kunkel | 285/331 |
| 2,730,380 | A | 1/1956 | Espy et al. | |
| 2,735,696 | A | 2/1956 | Omon et al. | |
| 2,825,590 | A | 4/1958 | Sutherland | |
| 2,976,066 | A | 3/1961 | Antoniades | |
| 3,046,026 | A | 7/1962 | Burrows | |
| 3,054,422 | A | 9/1962 | Napolitono | |
| 3,089,713 | A | 5/1963 | Scaranucri | |
| 3,111,179 | A | 11/1963 | Albers et al. | |
| 3,142,498 | A | 7/1964 | Press | |
| 3,163,431 | A | 12/1964 | Tanner | |
| 3,201,151 | A | 8/1965 | Westveer | |
| 3,205,911 | A | 9/1965 | Swick, Jr. | |
| 3,215,161 | A | 11/1965 | Goodwin et al. | |
| 3,236,251 | A | 2/1966 | Hansen | |

(Continued)

FOREIGN PATENT DOCUMENTS

| | | |
|---|---|---|
| CH | 343726 | 7/1956 |

(Continued)

OTHER PUBLICATIONS

Search Report received in corresponding British Patent Application No. 0519299.2 dated Oct. 17, 2005.

*Primary Examiner*—James M. Hewitt
(74) *Attorney, Agent, or Firm*—Wong, Cabello, Lutsch, Rutherford & Brucculeri, LLP

(57) ABSTRACT

An improved seal retainer for an undersea hydraulic coupling member, which utilizes metal seals to maintain fluid integrity, is disclosed. The metal seals of the present invention are designed to either create an absolute barrier to fluid flow, or utilize a press or interference fit to create a barrier to fluid flow to ensure fluid integrity between the undersea hydraulic coupling and the environment outside the hydraulic coupling.

12 Claims, 4 Drawing Sheets

U.S. PATENT DOCUMENTS

| | | | | |
|---|---|---|---|---|
| 3,291,152 | A | 12/1966 | Comer | |
| 3,301,578 | A * | 1/1967 | Platt et al. | 285/331 |
| 3,348,575 | A | 10/1967 | Simak | |
| 3,447,819 | A | 6/1969 | Borsum et al. | |
| 3,473,556 | A | 10/1969 | Johnson et al. | |
| 3,498,324 | A | 3/1970 | Breuning | |
| 3,507,523 | A | 4/1970 | Cadley | |
| 3,508,580 | A | 4/1970 | Snyder, Jr. | |
| 3,516,524 | A | 6/1970 | Kelty et al. | |
| 3,519,278 | A | 7/1970 | Fuhrmann | |
| 3,550,624 | A | 12/1970 | Johnson | |
| 3,618,690 | A | 11/1971 | Johnson | |
| 3,625,251 | A | 12/1971 | Nelson | |
| 3,707,878 | A | 1/1973 | Treichler | |
| 3,727,952 | A | 4/1973 | Richardson | |
| 3,797,510 | A | 3/1974 | Torres et al. | |
| 3,891,246 | A | 6/1975 | Hopper | |
| 3,899,199 | A | 8/1975 | Garey | |
| 3,917,220 | A | 11/1975 | Gilmore | |
| 3,918,485 | A | 11/1975 | Weber et al. | |
| 4,022,262 | A * | 5/1977 | Gunn | 411/302 |
| 4,044,993 | A | 8/1977 | Wheeler | |
| 4,124,228 | A | 11/1978 | Morrison | |
| 4,194,770 | A * | 3/1980 | Richards | 285/206 |
| 4,222,411 | A | 9/1980 | Herzan et al. | |
| 4,239,242 | A * | 12/1980 | Burns | 277/612 |
| 4,324,407 | A | 4/1982 | Upham et al. | |
| 4,348,039 | A | 9/1982 | Miller | |
| 4,448,000 | A * | 5/1984 | Manuccia et al. | 52/208 |
| 4,452,462 | A | 6/1984 | Karr, Jr. | |
| 4,453,566 | A | 6/1984 | Henderson, Jr. et al. | |
| 4,457,523 | A | 7/1984 | Halling et al. | |
| 4,476,772 | A | 10/1984 | Gorman et al. | |
| 4,519,636 | A * | 5/1985 | Tomlin et al. | 285/95 |
| 4,556,196 | A | 12/1985 | Nimberger | |
| 4,582,295 | A | 4/1986 | Kugler et al. | |
| 4,589,689 | A | 5/1986 | Regan | |
| 4,602,806 | A | 7/1986 | Saliger | |
| 4,637,470 | A | 1/1987 | Weathers et al. | |
| 4,641,841 | A | 2/1987 | Regan | |
| 4,656,393 | A | 4/1987 | Amboss | |
| 4,694,859 | A | 9/1987 | Smith | |
| 4,709,726 | A | 12/1987 | Fitzgibbons | |
| 4,709,727 | A | 12/1987 | Gober | |
| 4,768,538 | A | 9/1988 | Mintz et al. | |
| 4,817,668 | A | 4/1989 | Smith | |
| 4,884,584 | A | 12/1989 | Smith | |
| 4,900,071 | A * | 2/1990 | Smith, III | 285/379 |
| 4,903,993 | A | 2/1990 | Brammer | |
| 4,988,130 | A | 1/1991 | Obara et al. | |
| 5,029,613 | A | 7/1991 | Smith | |
| 5,052,439 | A * | 10/1991 | Smith, III | 137/614.04 |
| 5,087,504 | A * | 2/1992 | Kanai et al. | 428/167 |
| 5,284,183 | A | 2/1994 | Smith, III | |
| 5,339,861 | A | 8/1994 | Smith | |
| 5,368,070 | A | 11/1994 | Bosley | |
| 5,370,153 | A | 12/1994 | Galle | |
| 5,394,908 | A * | 3/1995 | Maness | 141/1 |
| 5,490,680 | A * | 2/1996 | Patel et al. | 277/608 |
| 5,564,177 | A * | 10/1996 | Fernandes et al. | 29/451 |
| 5,762,106 | A * | 6/1998 | Smith, III | 137/614.04 |
| 5,979,499 | A | 11/1999 | Smith | |
| 5,983,934 | A * | 11/1999 | Smith, III | 137/614.04 |
| 5,997,049 | A * | 12/1999 | Kingsford et al. | 285/331 |
| 6,003,537 | A * | 12/1999 | Bravo | 137/15.09 |
| 6,663,144 | B1 * | 12/2003 | Smith, III | 285/110 |

FOREIGN PATENT DOCUMENTS

| | | | |
|---|---|---|---|
| EP | 0024986 | | 3/1981 |
| EP | 0177650 | | 4/1986 |
| FR | 663132 | | 10/1928 |
| FR | 1142462 | | 12/1955 |
| FR | 76801 | | 11/1958 |
| FR | 1491524 | | 6/1966 |
| GB | 552435 | | 4/1943 |
| GB | 552682 | | 4/1943 |
| GB | 677685 | | 8/1952 |
| GB | 819421 | | 9/1959 |
| GB | 886133 | | 1/1962 |
| GB | 888143 | | 1/1962 |
| GB | 925491 | | 5/1963 |
| GB | 1548852 | | 7/1979 |
| GB | 1564906 | | 4/1980 |
| GB | 2034839 | A * | 6/1980 |
| GB | 1603670 | | 11/1981 |
| GB | 2 394 993 | | 5/2004 |

* cited by examiner

SEAL RETAINER WITH METAL SEAL MEMBERS FOR UNDERSEA HYDRAULIC COUPLING

BACKGROUND OF THE INVENTION

1. Field of the Invention

This invention relates, in general, to hydraulic couplings, and specifically to hydraulic couplings used in undersea drilling and production applications. More particularly, the invention involves undersea hydraulic couplings having seal retainers that hold and retain seals between the coupling members. The improved seal retainer of the present invention utilizes press fit or interference fit metal seals to provide the fluid integrity between the hydraulic coupling and surrounding fluid environment.

2. Description of Related Art

Subsea hydraulic couplings are old in the art. The couplings generally consist of a male member and a female member with seals to seal the junction between the male and female members. The female member generally has a cylindrical body with a relatively large diameter bore at one end and a relatively small diameter bore at the other. The small bore facilitates connections to hydraulic lines, while the large bore contains the seals and receives the male portion of the coupling. The male member includes a probe section insertable into the large bore of the female member. According to various embodiments of the device, the seals either abut the end, or face, of the male member or engage the male member about its outer circumference. Hydraulic fluid is then free to flow through the female and male portions of the coupling and seals prevent that flow from escaping about the joints of the coupling.

Optionally, a check valve may be installed in the female member and also in the male member. Each check valve is open when the coupling is made up; however, each check valve closes when the coupling is broken so as to prevent fluid from leaking out of the system of which the coupling is part.

U.S. Patent Application Publication No. 2004/0084902 a1 corresponding to application Ser. No. 10/285,062 filed on Oct. 31, 2002 commonly assigned to the assignee of the present invention, entitled “Seal Retainer For Undersea Hydraulic Coupling,” incorporated herein by reference, discloses a seal retainer for use with a female coupling member, wherein the seal retainer contains all seals for the female coupling. The seal retainer may be easily removed and repaired without damage to the female coupling member.

In higher pressure situations additional seal integrity may be desired to prevent fluid leakage from the hydraulic coupling. Therefore, what is needed is a seal retainer that contains metal seal that can be hydraulic pressure actuated to prevent fluid leakage in either direction inside the coupling. A copending application filed on the same day as the present application with the same assignee and inventor entitled “Seal Retainer with Pressure Energized Metal Seal Members for Undersea Hydraulic Couplings” is directed to the use of pressure energized metal seals and is incorporated herein by reference.

SUMMARY OF THE INVENTION

The present invention provides an improved seal retainer for an undersea hydraulic coupling that provides higher integrity press fit or interference fit metal seals while still providing the benefits of removal of seals as a single unit together with the seal retainer. The metal seals are designed to engage with a shoulder inside the receptacle of the female coupling member to prevent fluid passing through the coupling from mixing with fluid in the environment outside the hydraulic coupling.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Figure 1:
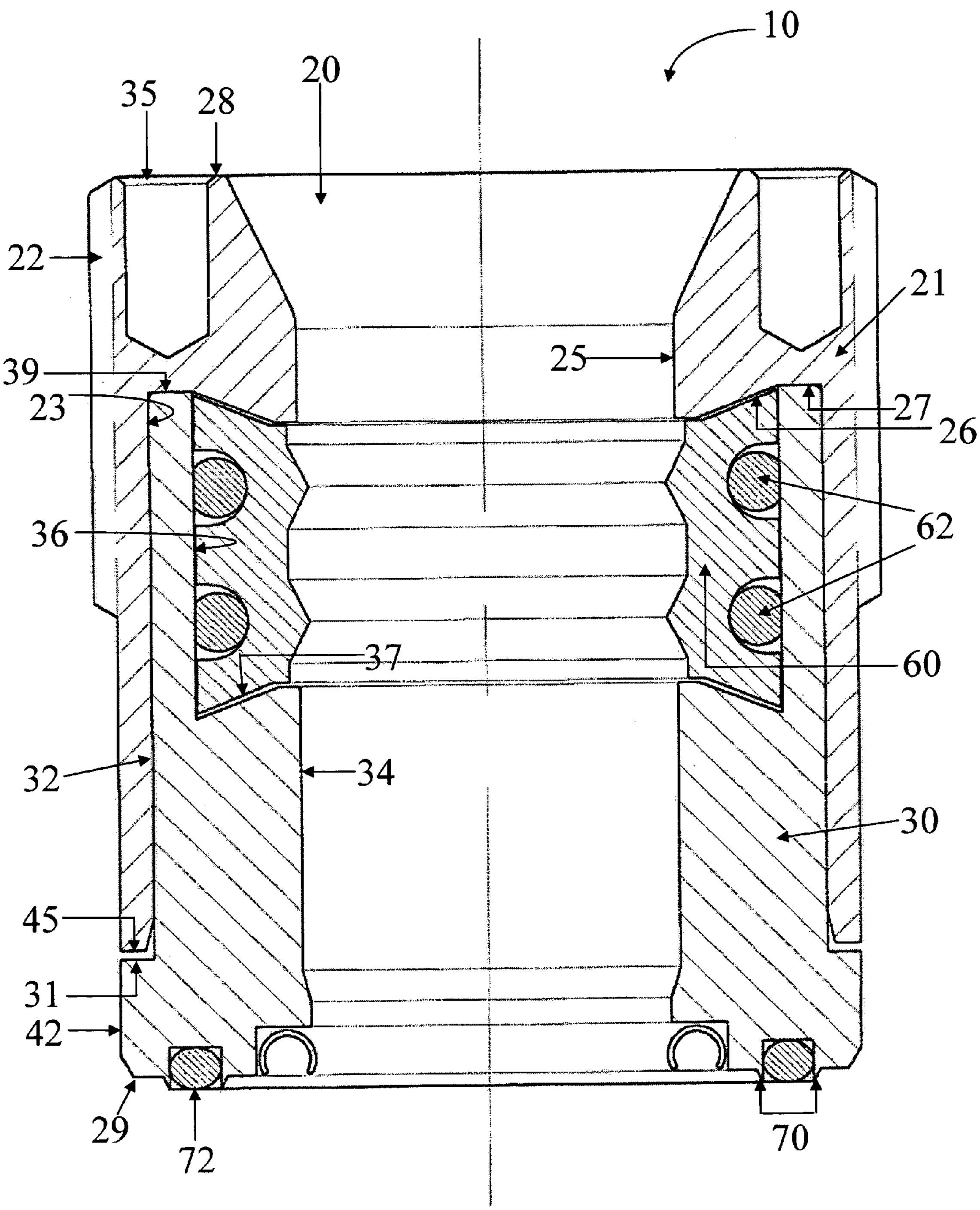
FIG. 1 is a section view of the improved seal retainer of the present invention according to a first embodiment.

As shown in FIG. 1, in a first embodiment, seal retainer 10 comprises shell 21 and seal carrier 30, with central bore 20 extending therethrough. The seal carrier fits together with the shell to form the seal retainer that may be inserted and removed from a female undersea hydraulic coupling member. The seal retainer 10 holds and secures one or more annular seals that are configured to engage the male coupling member. The seal retainer 10 also comprises seal members configured to engage the female coupling member.

In a first embodiment, the shell 21 is a generally ring-shaped body with an outer diameter 22 that may be threaded to engage the female coupling member. The shell 21 has first end 28, second end 45, first larger inner diameter 23, second smaller inner diameter 25, and internal shoulder 27 between the first and second inner diameters. The shell also may include negative or reverse angle shoulder 26 that extends radially inwardly from internal shoulder 27. Holes 35 may be included in the first end of the shell, and a spanner or other tool may be inserted into the holes to rotate the shell to engage or disengage it from the female member.

In the first embodiment, the seal carrier 30 is a generally ring shaped body, part of which engages or fits at least partially into the shell. The seal carrier 30 has a first end 39, which fits into the shell, second end 29, first larger outer diameter 42, second smaller outer diameter 32, first larger inner diameter 36, and second smaller inner diameter 34. In one embodiment, the seal carrier 30 may have negative or reverse angle shoulder 37 between the first larger inner diameter and second smaller inner diameter. The seal carrier also may include outer shoulder 31 between the first larger outer diameter and the second smaller outer diameter.

In one embodiment, the first end of the seal carrier slides into the first larger inner diameter 23 of the shell. There may be little or no clearance between the second smaller outer diameter of the seal carrier and the inner diameter of the shell, or there may be a slight interference fit. When the first end of the seal carrier is fully inserted into the shell, the first end 39 may abut internal step 27 of the shell, and first end 45 of the shell may abut outer shoulder 31 of the seal carrier.

In the embodiment of FIG. 1, the seal retainer holds third annular seal 60 between reverse angled shoulders 26 and 37 that restrain the seal from implosion into central bore 20. Third annular seal 60 may be an elastomeric ring with a dovetail cross section, and may have a dovetail interfit between the reverse angled shoulders. The inner diameter of the third annular seal 60 may extend further into the central bore than the smaller inner diameters of the shell or seal carrier, to seal radially with the male member when the male member is in the receiving chamber. O-rings 62 are included on the outer circumference of the third annular seal to form a seal with inner diameter 36 of the seal carrier 30.

Seal carrier 30 is preferably made of metal. Machined out of the body of seal carrier 30 is a groove that extends radially around the face of end 29. At the edges of the groove, sharp blade-like extensions are formed to create metal blade seals 70. An elastomeric o-ring 72 is placed in the groove to act as a secondary seal to the metal blade seals.

Figure 2:
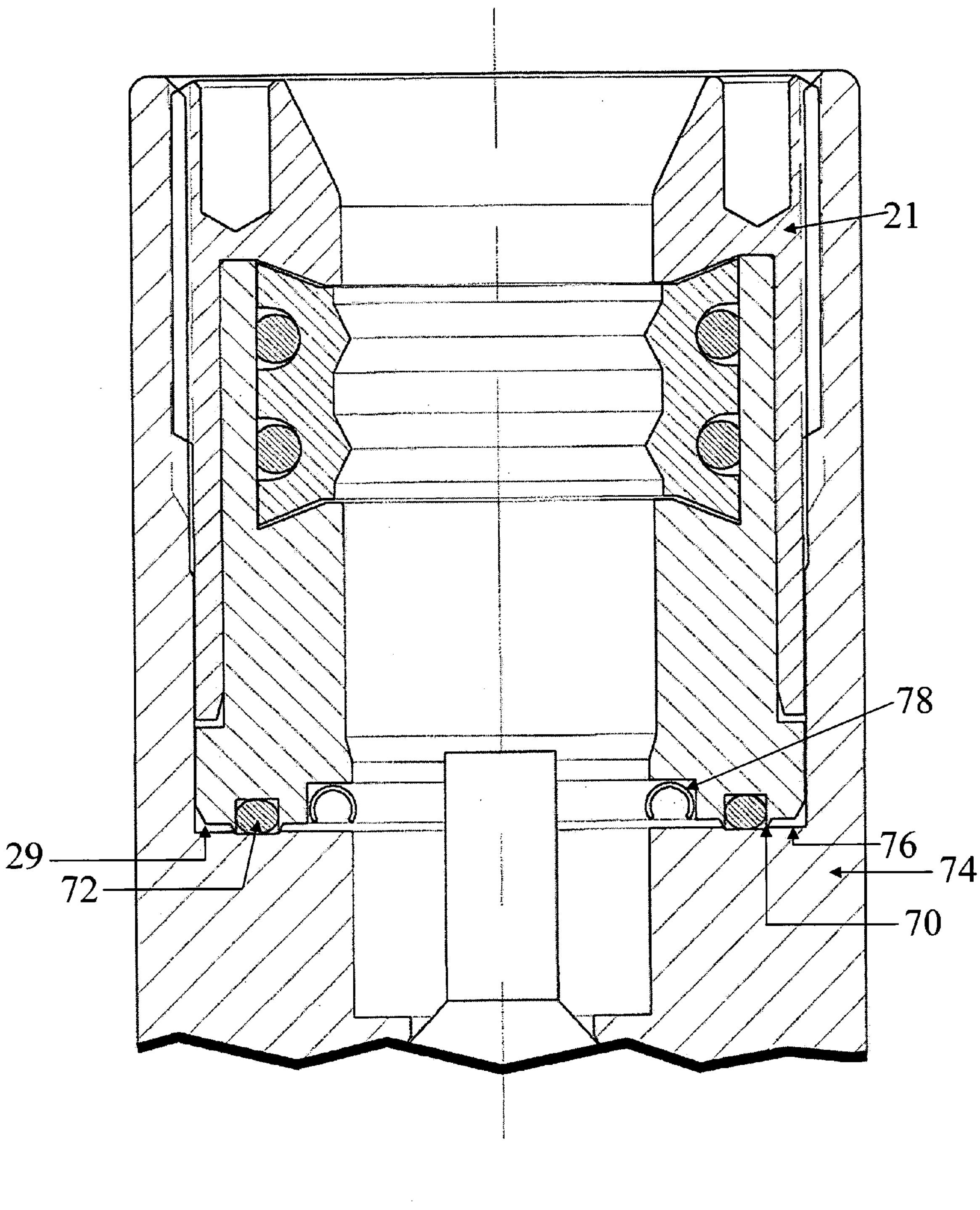
FIG. 2 is a section view of a female coupling member with the improved seal retainer according to the first embodiment.

FIG. 2 shows the seal retainer of FIG. 1 as it is installed in a female coupling member 74. End 29 of the seal carrier seats against shoulder 76 of the female coupling member. As the shell 21 is tightened down, the metal blade seals 70 will pierce the metal surface of the shoulder 76 forming an absolute barrier to fluid flow in either direction. Each metal blade seal backs up the other with the o-ring 72 acting as an additional secondary seal. An additional seal member in the form of metal "c" seal 78 is used to form seals with the probe of the male coupling member as well as the shoulder 76 of the female coupling member.

Figure 3:
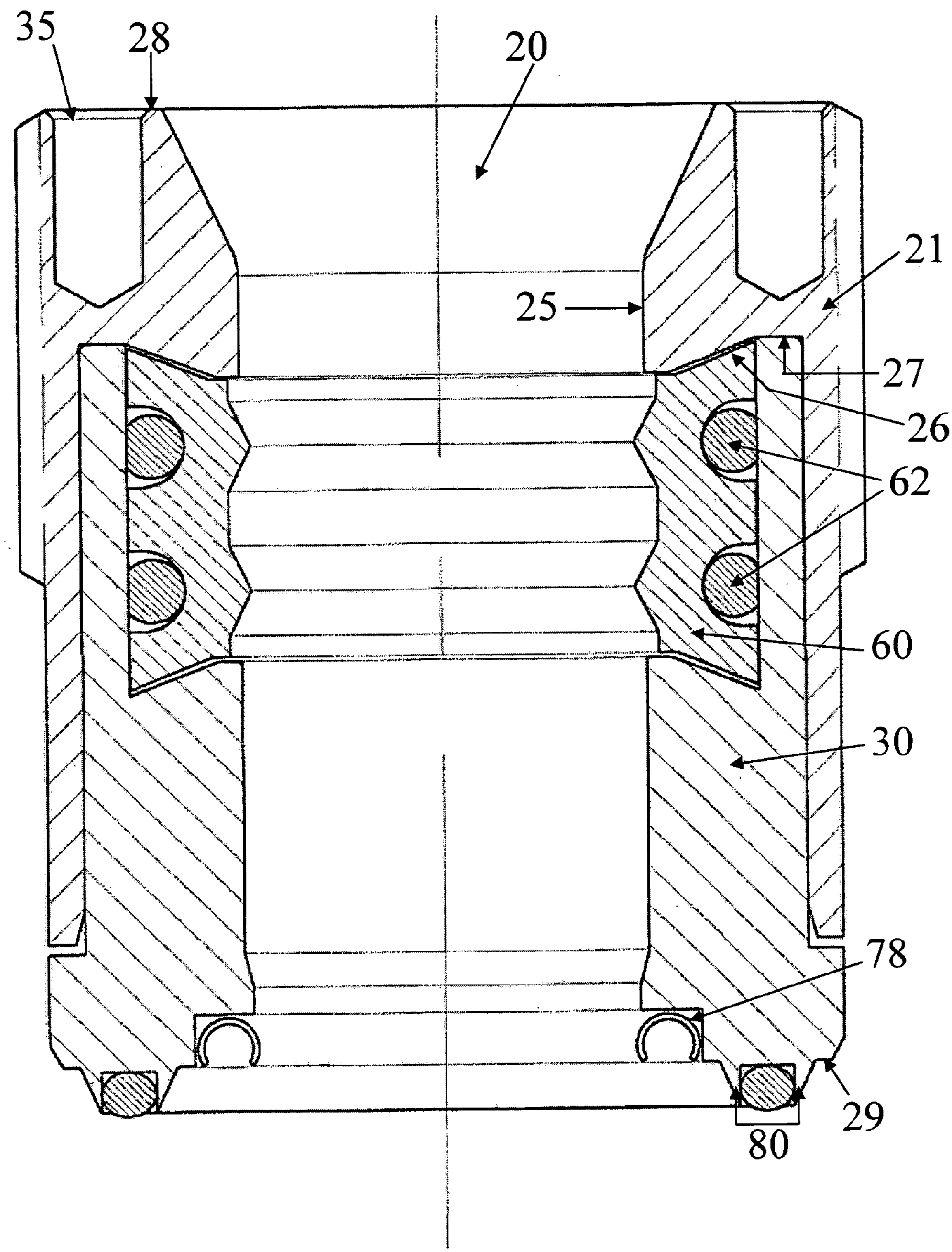
FIG. 3 is a section view of the improved seal retainer of the present invention according to a second embodiment.

FIG. 3 shows a second embodiment of the present invention. The elements of the seal retainer of FIGS. 1 and 2 that are the same in FIG. 3 have the same number. What is different is that instead of using the metal blade seals, an extension, that has tapered edges and a groove cut therein, is added to end 29 of the seal carrier. The tapered edges form two metal angular seals 80 that extend radially around the face of end 29.

Figure 4:
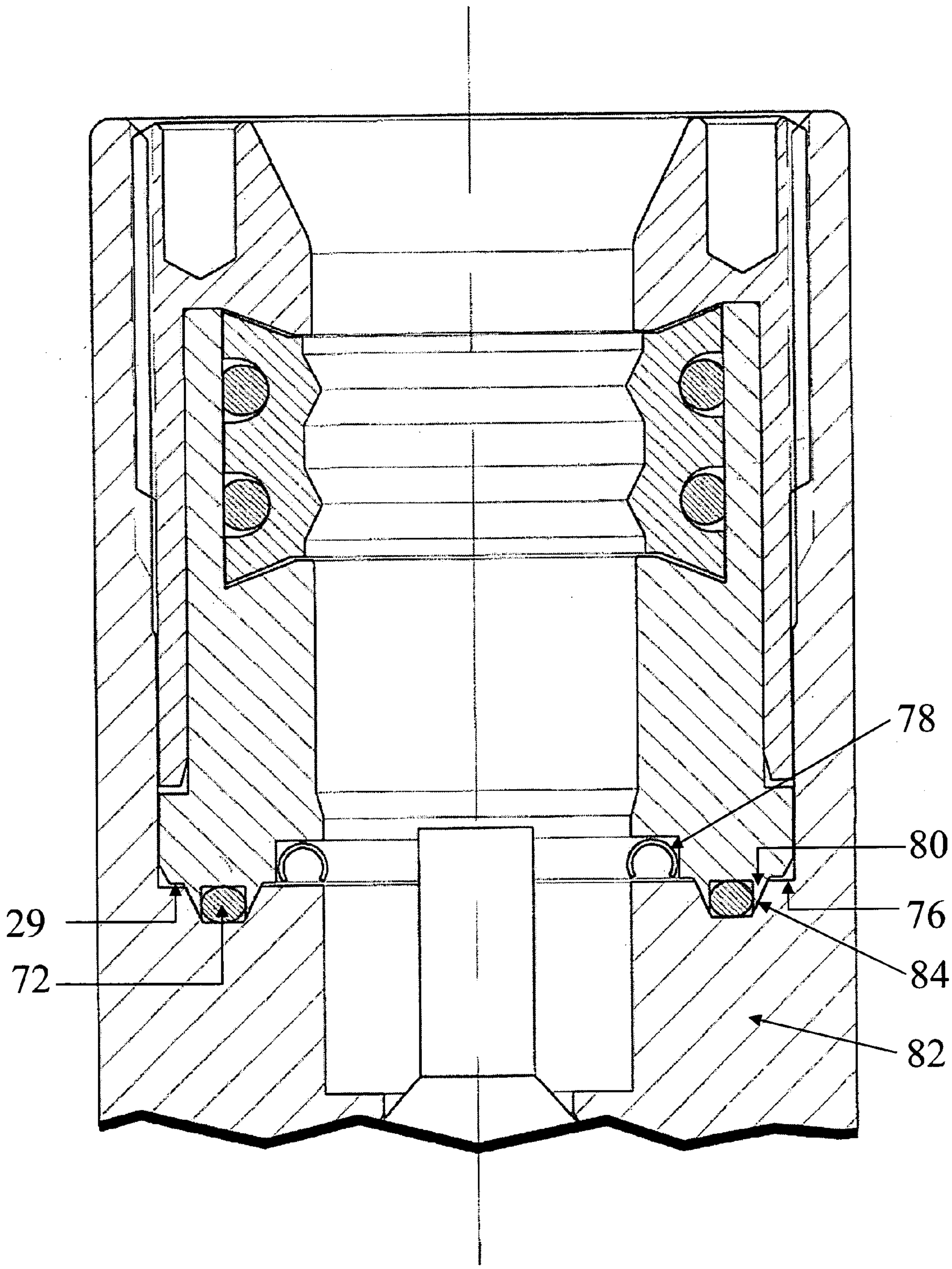
FIG. 4 is a section view of a female coupling member with the improved seal retainer according to a second embodiment.

FIG. 4 shows the second embodiment of the seal retainer shown in FIG. 3 as it is installed in a female coupling member. The female coupling member 82 is modified from the one shown in FIG. 2 by having the angled groove 84 cut into shoulder 76. The angles of groove 84 are machined so as to match up with the metal angular seals 80 of the seal retainer. The angles of groove 84 can be cut either so there is a snug interference fit with the metal angular seals, or they can be cut so that as the seal retainer is tightened down, the metal angular seals 80 are slightly displaced inward to create a press fit. Preferably the inward displacement is about 0.001 inches. Once installed, the interference or press fit between the angled sides of groove 84 and the metal angular seals 80 form two radial seals between the seal retainer and the female coupling member. The o-ring 72 provides a back up or secondary seal between the seal retainer and the female coupling member.

As those of skill in the art, not only are there variations to the configurations of the metal seals that may be made, but the invention could be used with additional metal seals. The invention, accordingly, should be understood to be limited only by the scope of the appended claims.

What is claimed is:

1. A female undersea hydraulic coupling member comprising:

a body having an internal bore and a shoulder intermediate the bore;

a seal retainer insertable into the bore to abut the shoulder, the seal retainer having an outer shell and an inner seal carrier, the inner seal carrier sliding into the outer shell and having an integral metal blade seal positioned such that the blade seal contacts the shoulder intermediate the bore when the seal retainer is inserted into the bore; and, an annular seal positioned on the seal carrier, the annular seal insertable into and removable from the female undersea hydraulic coupling.

2. A female undersea hydraulic coupling member as recited in claim 1 wherein the integral metal blade seal comprises a pair of concentric, annular metal blades.

3. A female undersea hydraulic coupling member as recited in claim 2 further comprising an elastomeric seal retained between the pair of concentric, annular metal blades.

4. A female undersea hydraulic coupling member as recited in claim 3 wherein the elastomeric seal is an O-ring seal.

5. A female undersea hydraulic coupling member comprising:

a body having an internal bore and a shoulder intermediate the bore;

an annular groove in the shoulder, the groove having side walls and a bottom surface;

a seal retainer insertable into the bore, the seal retainer having an outer shell and an inner seal carrier, the inner seal carrier sliding into the outer shell and having an integral metal blade seal positioned such that the blade seal contacts a side wall of the annular groove in the shoulder intermediate the bore when the seal retainer is inserted into the bore; and, an annular seal positioned on the seal carrier, the annular seal insertable into and removable from the female undersea hydraulic coupling.

6. A female undersea hydraulic coupling member as recited in claim 5 wherein the integral metal blade seal is tapered.

7. A female undersea hydraulic coupling member as recited in claim 6 wherein at least one side wall of the groove is angled at approximately the same angle as the taper of the blade seal to provide an interference fit between the blade seal and the side wall of the groove when the seal carrier is fully inserted in the bore.

8. A female undersea hydraulic coupling member as recited in claim 7 wherein the groove and blade seal are sized such that the blade seal contacts the bottom of the groove when the seal carrier is fully inserted in the bore.

9. A female undersea hydraulic coupling member as recited in claim 5 wherein the integral metal blade seal comprises a pair of concentric, annular metal blades.

10. A female undersea hydraulic coupling member as recited in claim 9 further comprising an elastomeric seal retained between the pair of concentric, annular metal blades.

11. A female undersea hydraulic coupling member as recited in claim 10 wherein the elastomeric seal is an O-ring seal.

12. A female undersea hydraulic coupling member as recited in claim 11 wherein the elastomeric O-ring seal is in sealing engagement with the bottom of the groove when the seal carrier is fully inserted in the bore.

* * * * *